(12) United States Patent
Kunz et al.

(10) Patent No.: US 8,578,807 B2
(45) Date of Patent: Nov. 12, 2013

(54) HIGH SPEED GEAR SIZED AND CONFIGURED TO REDUCE WINDAGE LOSS

(75) Inventors: Robert F. Kunz, State College, PA (US); Richard B. Medvitz, State College, PA (US); Matthew John Hill, Keller, TX (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 13/449,569

(22) Filed: Apr. 18, 2012

(65) Prior Publication Data

US 2012/0312115 A1     Dec. 13, 2012

Related U.S. Application Data

(60) Provisional application No. 61/477,666, filed on Apr. 21, 2011.

(51) Int. Cl.
*F16H 55/17*     (2006.01)
(52) U.S. Cl.
USPC .............................................. 74/457; 74/462
(58) Field of Classification Search
USPC ........................................ 74/457, 459.5, 462
See application file for complete search history.

(56) References Cited

U.S. PATENT DOCUMENTS

| | | | |
|---|---|---|---|
| 2,923,166 A | * | 2/1960 | Brindley et al. ............... 474/152 |
| 3,367,462 A | * | 2/1968 | Bibbens ......................... 192/55.2 |
| 3,861,231 A | | 1/1975 | F'Geppert |
| 3,996,816 A | | 12/1976 | Brighton |
| 5,048,370 A | | 9/1991 | Duello |
| 5,083,474 A | | 1/1992 | Rouverol |
| 5,271,288 A | | 12/1993 | Hayduk et al. |
| 5,315,790 A | | 5/1994 | Kish et al. |

(Continued)

FOREIGN PATENT DOCUMENTS

| | | |
|---|---|---|
| CH | 688523 A5 | 10/1997 |
| RU | 2093741 C1 | 10/1997 |

OTHER PUBLICATIONS

Handschuh et al., "CFD Analysis of Gear Windage Losses: Validation and Parametric Aerodynamic Studies", May 11, 2010, American Helicopter Society 66th Annual Forum. All pages, especially figures 33 and 40.*
V.A. Dobrovolsky "Detali Mashin" Kiev, 1950, p. 394.

(Continued)

*Primary Examiner* — David M Fenstermacher
*Assistant Examiner* — Terence Boes
(74) *Attorney, Agent, or Firm* — Buchanan Ingersoll & Rooney PC

(57) ABSTRACT

A gear and drive system utilizing the gear include teeth. Each of the teeth has a first side and a second side opposite the first side that extends from a body of the gear. For each tooth of the gear, a first extended portion is attached to the first side of the tooth to divert flow of fluid adjacent to the body of the gear to reduce windage losses that occur when the gear rotates. The gear may be utilized in drive systems that may have high rotational speeds, such as speeds where the tip velocities are greater than or equal to about 68 m/s. Some embodiments of the gear may also utilize teeth that also have second extended portions attached to the second sides of the teeth to divert flow of fluid adjacent to the body of the gear to reduce windage losses that occur when the gear rotates.

16 Claims, 9 Drawing Sheets

(56) References Cited

U.S. PATENT DOCUMENTS

| | | |
|---|---|---|
| 6,128,969 A | 10/2000 | Litvin et al. |
| 7,526,977 B2 * | 5/2009 | Masui .............................. 74/462 |
| 7,581,695 B2 | 9/2009 | Gasparini et al. |
| 2002/0134184 A1 | 9/2002 | Hawkins |
| 2004/0088861 A1 | 5/2004 | Vinayak et al. |
| 2005/0160857 A1 * | 7/2005 | Takeuchi ........................ 74/425 |
| 2010/0132493 A1 | 6/2010 | Tan |

OTHER PUBLICATIONS

Written Opinion of the International Searching Authority dated Sep. 13, 2012.

International Search Report dated Sep. 13, 2012.

* cited by examiner

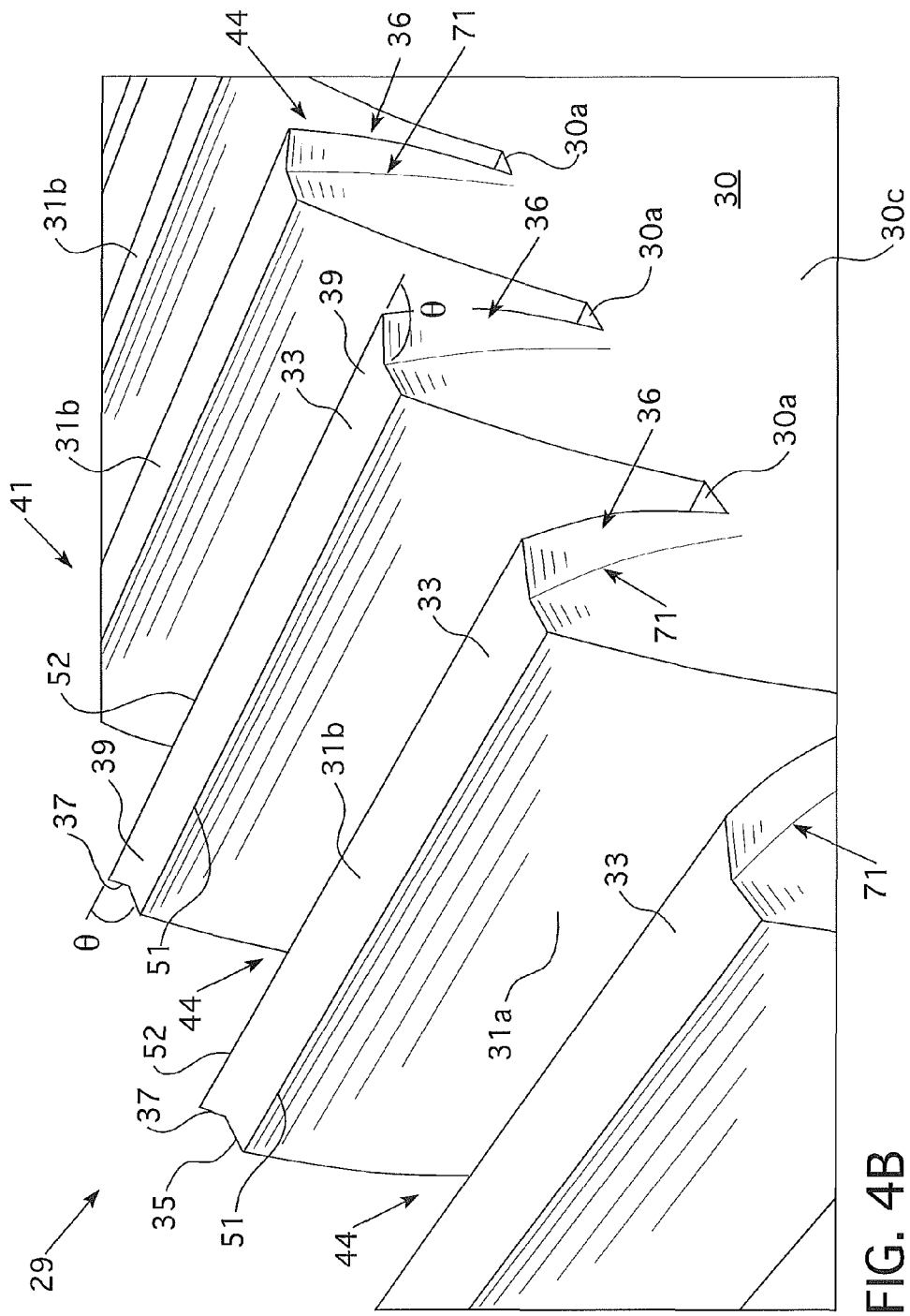

HIGH SPEED GEAR SIZED AND CONFIGURED TO REDUCE WINDAGE LOSS

CROSS-REFERENCE TO RELATED APPLICATIONS

The present patent application claims priority to U.S. Provisional Patent Application No. 61/477,666, which was filed on Apr. 21, 2011. The entirety of U.S. Provisional Patent Application No. 61/477,666 is incorporated by reference herein.

STATEMENT REGARDING FEDERALLY SPONSORED RESEARCH

This invention was made with government support under Contract No. NNX07AB34A, awarded by National Aeronautics & Space Administration (NASA). The Government has certain rights in the invention. See 35 U.S.C. §202.

FIELD OF INVENTION

The present invention relates to gears used in high speed rotational settings such as speeds where the tip speed Mach number is greater than or equal to 0.2, which is about 68 m/s. Examples of such gears may be used in the aerospace industry. For instance, examples of such gears may be gears used in drive systems that are configured to drive helicopter rotors, rotors of rotorcraft, propellers of airplanes, fans on aircraft gas turbine engines. Also, such gears may be gears used in high speed centrifugal compressors and centrifugal turbines to match nominal motor and generator speeds, boiler feed pumps, turbo compound units for diesel engines, and ultra-high speed turbines as exist in torpedo systems.

BACKGROUND OF THE INVENTION

Gears are used in a number of different mechanisms. For instance, gears are often used in cars to translate power provided by an engine into movement via rotating wheels. Gears may also be used in rotorcraft to drive the rotation of rotors. Examples of gears that may be used in different vehicles or devices may be appreciated from U.S. Pat. Nos. 3,996,816, 5,083,474, 5,315,790, 6,128,969, 7,581,695, and U.S. Patent Application Publication Nos. 2002/0134184, 2004/0088861 and 2010/0132493.

Often, gears are shaped or configured to improve the impingement, bearing or shaft losses that may occur from intermeshing gears rotating. For instance, losses of energy that result from the friction that occurs when gears mesh with (i.e., contact) one another during rotational movement may be lessened by some structural changes to the gear teeth. These changes to the gear teeth are made along the entire profile (cross-sectional shape) of the teeth. Therefore, gear teeth typically all have a uniform shape throughout the entire width of the gear. U.S. Pat. No. 3,996,816, for instance, illustrates changes in gear teeth shape that may be made to improve energy losses that may result from meshing. Gear tooth modifications that reduce these meshing losses do not impact another important gear loss, windage loss.

Gear windage losses refer to the power losses that are a result of aerodynamic forces (pressure and viscous) acting against the rotation of high-speed gears. Windage losses are a source of significant heating and fuel consumption in rotorcraft and other VTOL systems. The weight and packaging constraints inherent in these systems require the gearing components to be both lightweight and heavily loaded. Attendant to this, the gears are required to operate at high rotational speeds where windage losses become significant with respect to other gearbox losses (meshing, sliding, and lubrication losses).

Windage loss is a phenomenon that occurs when gears rotate. Gears that rotate at relatively low speeds usually experience a negligible amount of windage loss. As a result, those of ordinary skill in the art have essentially no motivation to design gears that are used in low speed rotational systems to address windage loss. For example, gears used in cars or trains are generally not designed with addressing windage loss as a design objective.

Windage loss may became a major source of inefficiency in high speed rotation systems that utilize gears rotating at high speeds, such as a speed that corresponds to tip speeds greater than a Mach number of 0.2, which is about 68 m/s. Generally, those of ordinary skill in the art are unaware of the cause of windage loss. It has previously been determined, however, that the use of shrouds that cover gears may help reduce windage loss. For example, U.S. Pat. No. 5,048,370 discloses the use of such shrouds. The use of shrouds and baffle configurations for such shrouding may reduce windage loss and may also reduce the consumption rate for lubricating oil used in conjunction with gears in a drive system. However, the physics explaining why the shrouding and baffle configurations have such an impact have not been the subject of much research and are not well understood.

The shrouding and baffling are features that must be positioned adjacent to the gears. Shrouds and baffles do not rotate. They need to be reasonably heavy for structural integrity, and they need to completely surround the gears with minimum oil drainage holes or other leakage paths (or else they will not reduce windage loss efficiently). Accordingly, the use of shrouding and baffling for windage loss has practical limitations.

A new gear is needed that provides a significant reduction in windage loss relative to conventional gear designs used in high speed rotational systems. Such a gear design is preferably shaped and configured to permit gears to be easily manufactured using conventional manufacturing techniques. Such gear designs are also preferably useable in conjunction with shrouding or baffle configurations to further enhance the reductions in windage loss that may be obtained by the new gear designs.

SUMMARY OF THE INVENTION

The present invention targets modifying one or more high speed gears to reduce windage loss, an approach which does not have the limitations associated with shrouding or baffles that are currently used in the art. It is believed that there are no previously known modifications to the gears themselves that address the reduction of windage loss.

Gear geometry modifications that may be used in drive systems are provided herein. Embodiments of the gears may be utilized in a drive system, for rotorcraft, airplanes or other vehicles or devices that would require relatively high gear rotational speeds, such as where tip speeds exceed or is equal to a tip speed of 68 m/s or a Mach number of 0.2.

One embodiment of the invention is a drive system that includes at least one gear where the teeth of the gear include extended portions or ramps adjacent to one side or both sides of the gear that extend outwardly beyond the one or both sides of the body of the gear on the trailing side of the tooth. The extended portions of the teeth are sized and configured to divert flow of fluid adjacent to the sides of the gear away from the gear so as to reduce the flow of fluid passing into channels defined between the teeth. This reduction in flow passing into the channel reduces windage loss. Another embodiment of the invention is a gear where a thin annular shape structure is attached to the gear to affect full or partial flow blockage of the end of the channels between the teeth. These thin structures are attached directly to the gear and configured to minimize the entrainment of flow passing into channels defined between the teeth. This reduction in flow passing into the channel reduces windage loss.

An embodiment of our gear may include a body that has a first side and a second side opposite the first side. A surface may extend between the first and second sides. A plurality of teeth extend from the surface. Each of the teeth has a base portion adjacent to the surface and a distal portion that defines a tip of the tooth. Each tooth also has a first side adjacent to the first side of the body and a second side adjacent to the second side of the body. The gear also includes a plurality of first extended portions. The first side of each tooth is attached to a respective one of the first extended portions so that the extended portion to which it is attached extends beyond the first side of the body to divert a flow of fluid adjacent to the first side of the body to reduce windage losses that occur when the gear rotates.

The teeth may be integral with the body and may be composed of steel, aluminum, an alloy, or another type of metal. The teeth could also be composed of a ceramic material, a composite material, a polymeric material, or a plastic.

Some embodiments of the gear may also include second extended portions. Each tooth may be attached to a respective one of the second extended portions so that the second extended portion to which it is attached extends beyond the second side of the body to divert a flow of fluid adjacent to the second side of the body to reduce windage losses that occur when the gear rotates.

Preferably, the gear is sized and configured for use in systems requires the gear to rotate at speeds with tip speeds greater than or equal to one of a Mach number of 0.2 and 68 meters per second (m/s). The fluid that may be adjacent to the gear may be a mixture of oil and air, may be oil, or may be a liquid, gas or mixture of liquid and gas.

In some embodiments of the gear, the body may include a hole or other type of aperture that is sized and configured to receive at least a portion o the axle. The gear may rotate about the axle or rotation of the axle may cause rotation of the gear.

In some embodiments of the gear, the teeth may extend from the base portion to the tip portion in a direction that is perpendicular or substantially perpendicular to the axis of rotation along which that gear rotates. Embodiments of such a gear may be a spur gear, a helical gear, a bevel gear, a planetary sun gear, a planetary star gear, a planetary ring gear, an internal gear or a sprocket.

In some embodiments of the gear, the first extended portions may be attached to respective ones of the teeth so that the first extended portions extend such that each of the first extended portions project at between a 90° and 180° angle relative to at least one of a middle portion of the tooth positioned between the first and second sides of the tooth and the first side of the body.

The first extended portions may have a number of different structural configurations. In one embodiment, the first extended portions may each include a structure defining a ramp that is integrally attached to the tooth to which that portion is attached. The ramp may define a first outer surface that extends outwardly from the first side of the tooth to which the first extended portion is attached to an outer edge. The ramp may also define a second surface that extends from the outer edge to the first side of the tooth to which the first extended portion is attached. In some embodiments, the second surface may face a direction that is opposite or transverse to the direction in which the first surface faces.

In one embodiment of the gear, each of the first extended portions may extend beyond the first side of the body such that each of the first extended portions defines a groove or furrow. The base portions of the teeth may be spaced apart from each other along the surface of the body to define channels between immediately adjacent teeth. The first extended portions may be configured to partially divert fluid from passing into the channels t reduce the windage losses.

Embodiments of the gear may be configured so that each of the first extended portions is sized and configured to define a ramp having an inner edge, an outer edge and a first outer surface extending outwardly from the inner edge to the outer edge. The first extended portion may be attached to the first side of the tooth at the inner edge. Each of the first extended portions may also comprise a wall that is defined by a second outer surface extending from the outer edge of the ramp to a portion of the first side of the tooth. In some embodiments, a first space may be defined between the inner edge of the ramp and a first face of the tooth to which the first extended portion is attached for each of the first extended portions. A second space may also be defined between an inner edge of the wall of the ramp engaging the first side of the tooth to which the first extended portion is attached and a second face of the tooth to which the first extended portion is attached for each first extended portion. It should be understood that the second face of each tooth may be opposite the first face of that tooth.

Another embodiment of my gear may include annular structures that serve as extended portions or may not be extended portions but may be configured to block or partially block fluid from passing into channels defined between immediately adjacent teeth of the gear. An embodiment of the gear may include a body and a plurality of teeth that extend from the surface of the body of the gear. A first annular structure may be attached to the first side of each of the teeth to block or partially block channels defined between the teeth. A second annular structure may be attached to the second side of each of the teeth to block or partially block the channels defined between the teeth. The first and second annular structures may be configured to reduce windage losses that occur when the gear rotates. It is contemplated that the annular structures may be welded to the teeth, integrally attached to the teeth or be integrally molded with the teeth when the gear is formed. In yet other embodiments, the annular structures may be alternatively attached or fastened to the teeth. In a contemplated alternative embodiment, the gear may only have one of the first and second annular structures.

Embodiments of a drive system are also provided. The drive system may include multiple gears and an axle connected to at least a first gear of the plurality of gears to rotate that first gear. The first gear may be configured to be an embodiment of a gear as referenced above or as further discussed below. A second gear of this plurality of gears may also have such a configuration. The first and second gears may be positioned so that they intermesh such that that first teeth of the first gear intermesh with the second teeth of the second gear to rotate the second gear. Both of these gears may at least be partially surrounded by fluid.

In some embodiments of the drive system, the first gear and second gear may be configured to provide a reduction ratio of between 10:1 and 200:1.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of our gear, drive systems that utilize one or more embodiments of our gear, and methods of making and using the same are shown in the accompanying drawings. It should be appreciated that like reference numbers used in the drawings may identify like components.

FIG. 4B is a view similar to FIG. 4A of the present preferred gear illustrating a second side of the gear teeth of the gear.

DETAILED DESCRIPTION OF PRESENT PREFERRED EMBODIMENTS

We provide gears that may be utilized in drive systems or other high speed rotational systems that provide a relatively large reduction in windage loss experienced by the rotating gears. It is contemplated, as substantiated by engineering analysis, that embodiments of our gears may have windage losses reduced by as much as 40-60%. Such loss reductions may be due to the ramps on the sides of the gear teeth, which extend beyond the faces of the gear to divert flow of fluid adjacent to the gear such that the reduced amount of fluid passing between the teeth of the gear provides a much lower amount of drag on the rotating gear. Such loss reductions may be due to a relatively thin annular structures attached to the sides of the gears that are sized and configured to block flow of fluid adjacent to the gear. The reduced amount of fluid passing between the teeth of the gear provides a much lower amount of drag on the rotating gear.

Figure 1:
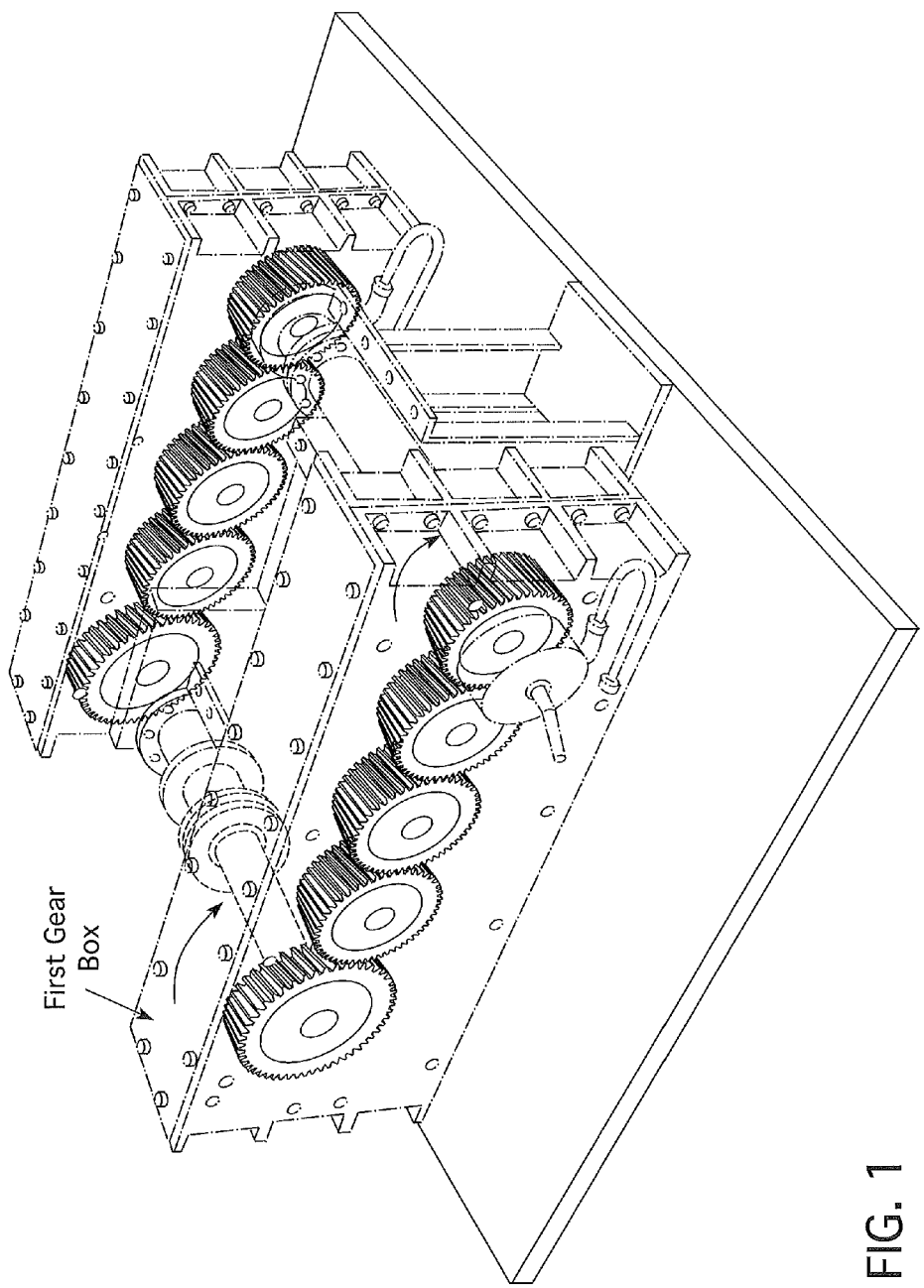
FIG. 1 is a perspective fragmentary view of an embodiment of a drive system that may be included in drive systems of airplanes or rotorcraft such as, for example, helicopters.

An example of an embodiment of a drive system is shown in FIG. 1. In this Figure, the labeled first gearbox is closely representative of a high speed rotorcraft system. The high speed drive system may include a high speed shaft (input torque from engine) and a low speed shaft (output torque to rotor of aircraft). The first gearbox may have several gears in order that the overall rotation ratio of the system be high (as required in rotorcraft for example). Each of these gears intermesh with one or two other gears. Each of these gears produces windage loss that could be reduced by embodiments of the present invention.

It should be appreciated that an embodiment of the drive system may include a drive motor that is connected to a speed up gearbox and a magnetic particle brake. An axle may extend from the magnetic particle brake to a gear of a gearbox to rotate the gear. The axle may be positioned in an aperture or opening formed in the body of the gear to rotate the gear along an axis of rotation defined by the length of the axle. Sensors may be connected to components of the drive system to monitor or measure different conditions. For instance, a torquemeter may be connected to the gear box to measure the amount of torque that is applied by a gear.

It should be understood that the high speed drive system may include a high speed shaft (input torque from engine) and a low speed shaft (output torque to rotor of aircraft). The gearbox may have several gears in order that the overall rotation ratio of the system is high (as required in rotorcraft for example). Each of these gears intermesh with one or two other gears. Each of these gears produces windage loss that could be reduced by embodiments of the present invention.

Figure 2:
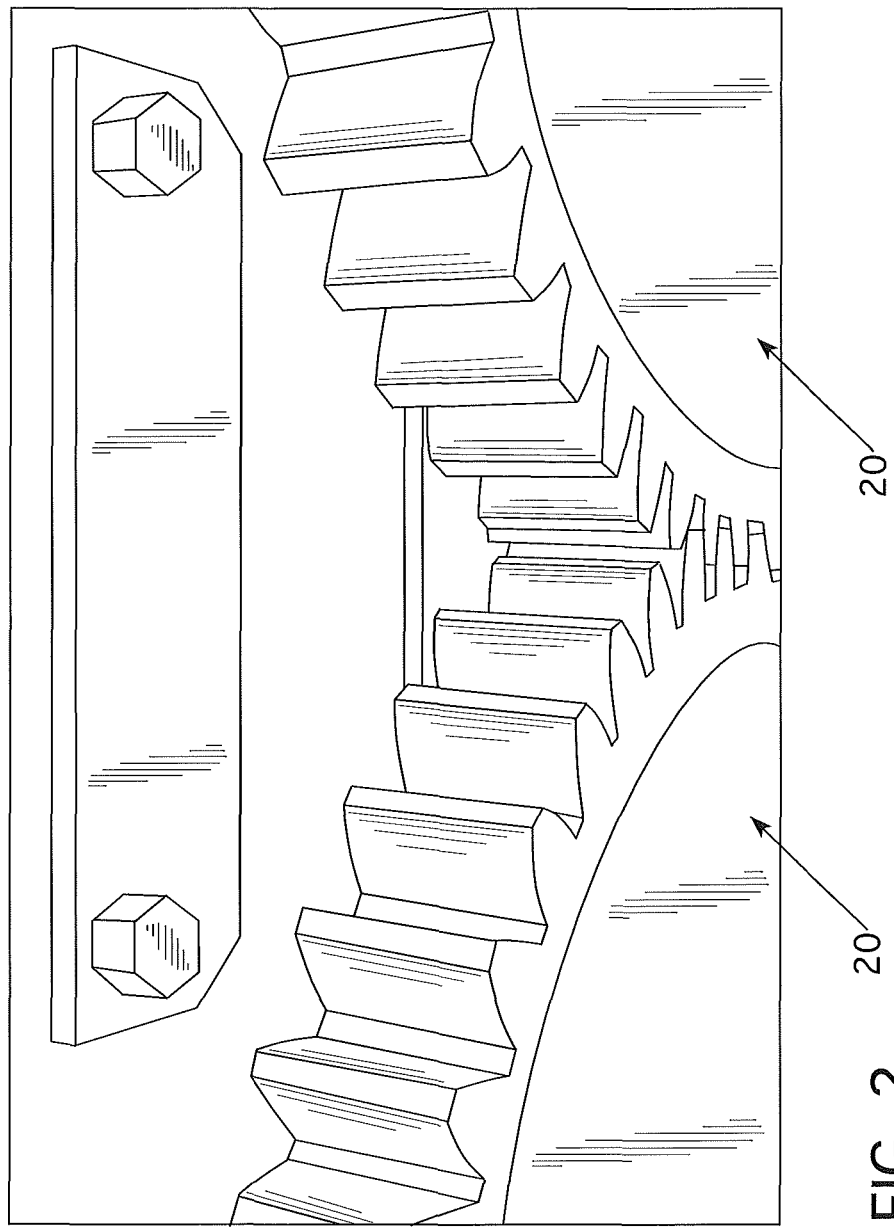
FIG. 2 is a fragmentary view of exemplary gears illustrating two intermeshed spur gears that are not shrouded.
Figure 3:
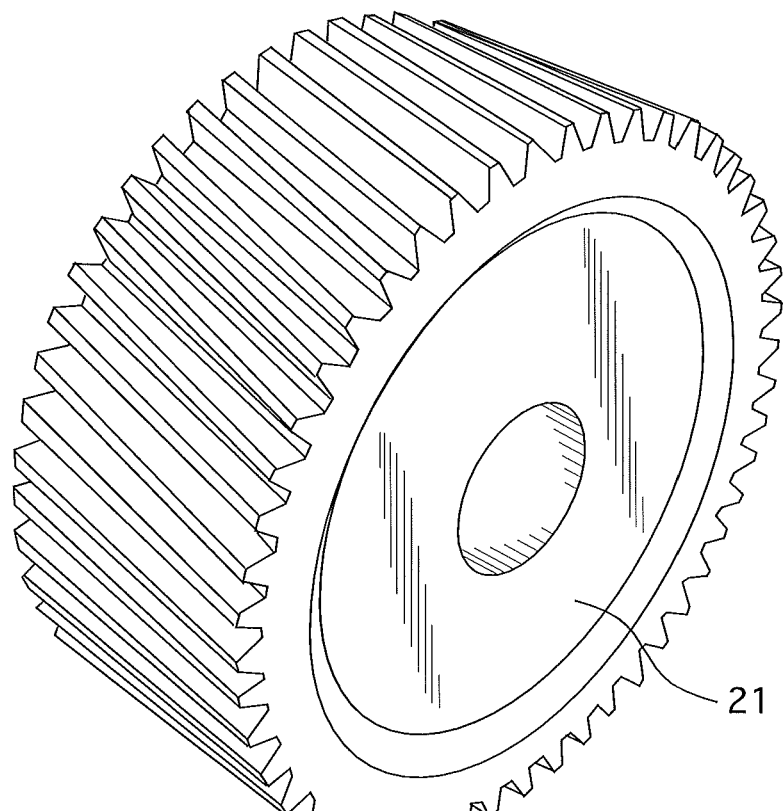
FIG. 3 is a perspective view of an exemplary gear illustrating a helical gear that is not shrouded.
Figure 3A:
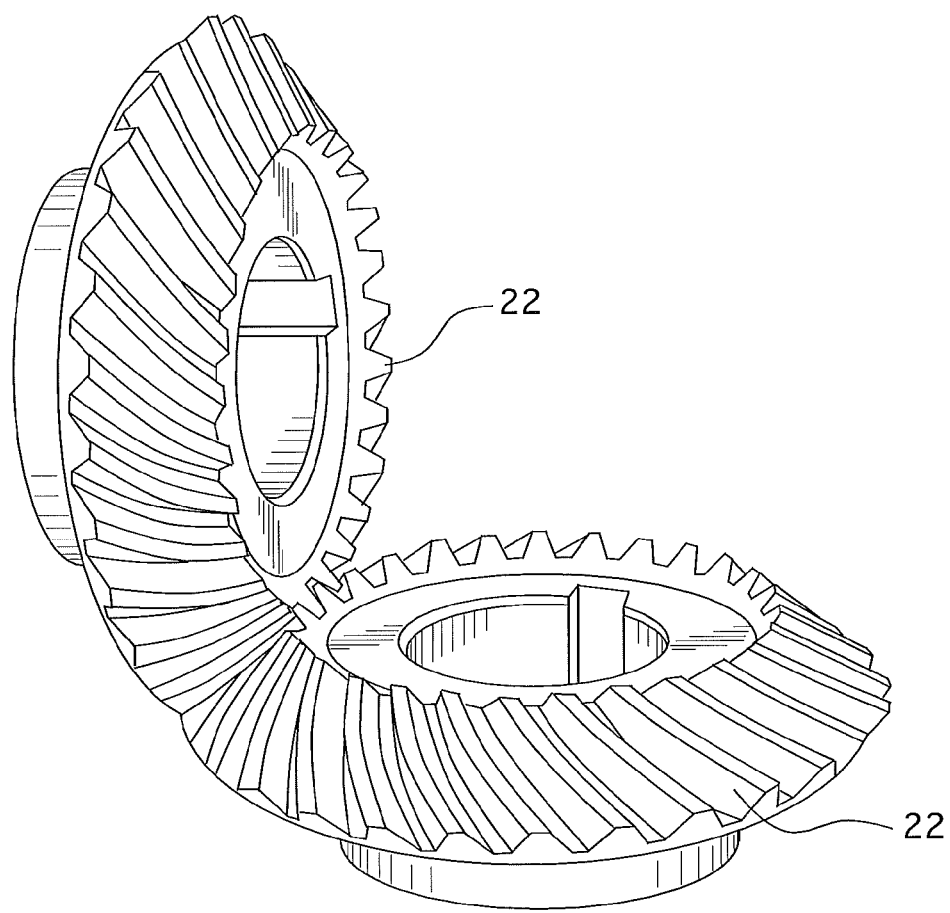
FIG. 3A is a perspective view of exemplary gears illustrating intermeshed spiral bevel gears.

It should be understood that the teeth of the gears may have any of a number of shapes or sizes. For instance, the gear teeth may define teeth of a spur gear 20 or may be teeth of a helical gear 21 as may be seen in FIGS. 2 and 3. As an alternative example, the gear may be a bevel gear or spiral bevel gear 22 as may be appreciated from FIG. 3A.

Figure 4A:
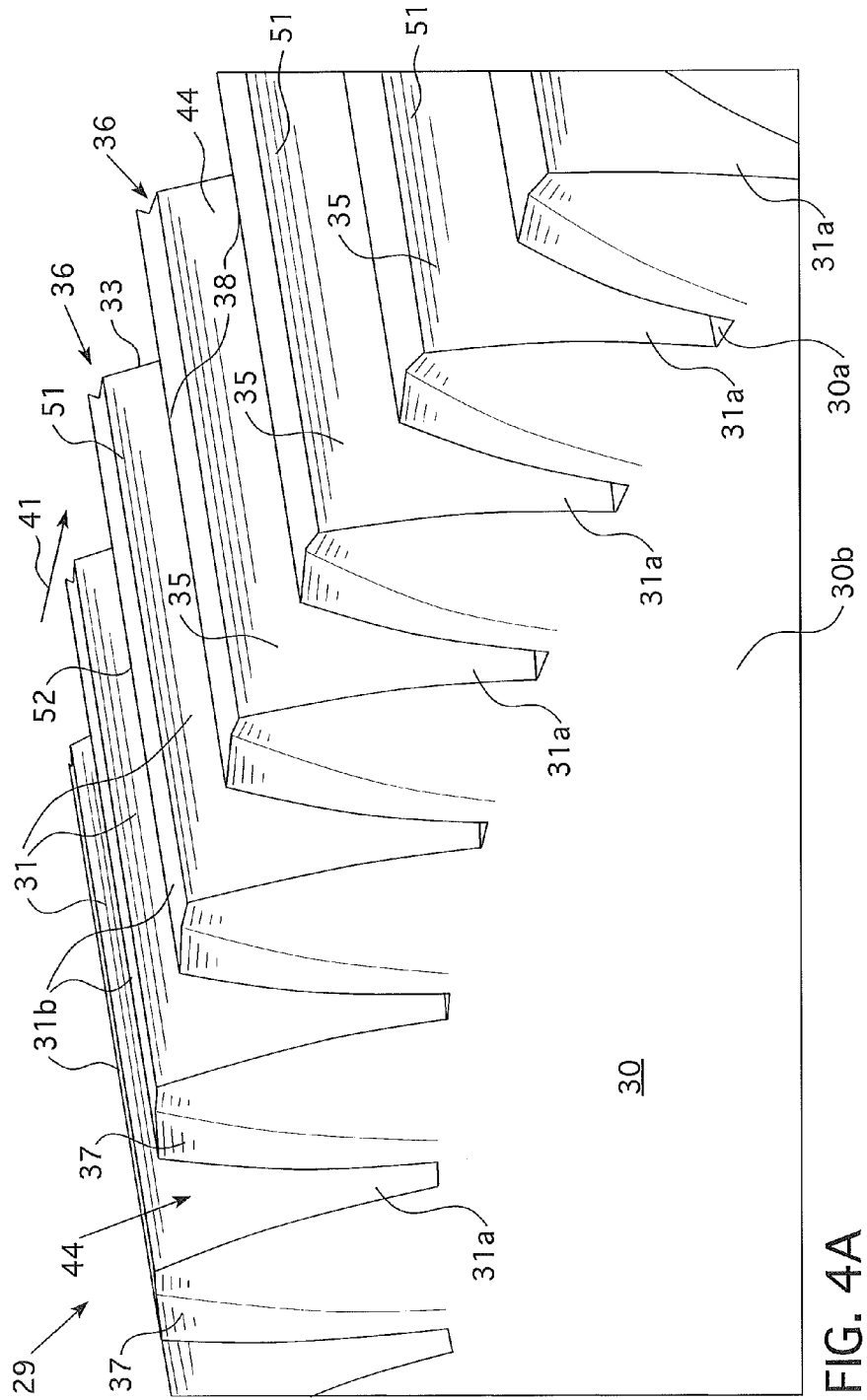
FIG. 4A is a perspective view of the right side of a present preferred gear to illustrate a first side of gear teeth of the gear. Arrow 41 illustrates the direction in which the gear is designed to rotate.

Referring to FIGS. 4A and 4B, a plurality of teeth 31 used in some embodiments of our gear may be appreciated. The teeth may project from a body portion 30 of a gear 29. The body 30 of the gear may have a surface 30a that extends between a first side 30b and second side 30c of the body 30 of the gear. The teeth 31 may extend from the surface 30a of the body 30. Each tooth 31 may include a base portion 31a positioned or connected adjacent to the surface 30a of the body 30 and a distal end portion 31b that extends away from the base portion 31a and surface 30a of the gear body 30. The distal ends of the distal end portions 31b of the teeth may define the tips of the teeth.

The body 30 of the gear may define an opening or aperture that is sized and configured to receive a portion of an axle for connecting with the axle. The axle may define an axis of rotation for the gear 29 such that the gear is rotatable in the direction of arrow 41. Of course, in alternative embodiments, the gear 29 may be configured to rotate in a direction opposite arrow 41. It should be appreciated that the teeth 31 extend from the body in a direction that is perpendicular or substantially perpendicular to the axis of rotation of the gear 29. For instance, the teeth may extend in such a direction that is substantially perpendicular or perpendicular to the axis of rotation if the teeth are arranged similar to teeth of a spur gear or similar to the teeth of a helical gear.

A first side 35 of each of the teeth is positioned adjacent to the first side 30b of the body 30 of the gear. The first side of each tooth may define a face for the first side of that tooth. An extended portion 37 may be attached to the first side 35 of each of the teeth 31 and extend beyond the first side of the body. A second side 33 of each of the teeth is positioned on a side opposite the first side of the teeth. The second side 33 of each of the teeth is adjacent to the second side of the body of the gear. The second side of each of the teeth includes an extended portion 36 that extends beyond the second side 30c of the body 30. A middle portion 38 of each tooth 31 is positioned between the first side portion 35 and second side portion 33.

As may be appreciated from FIGS. 4A and 4B, the extended portions 36 and 37 are sized and configured to extend at an angle θ from a middle portion 39 of the teeth or side of the body 30b, 30c. The angle θ may be, for example, between 90° and 180° for each extended portion 36 and 37. The angle θ may be the same for each extended portion relative to the body of the gear at the side adjacent to that extended portion. Alternatively, the angle θ for the extended portion on one side may be different than the angle used for the extended portions of the opposite side. For instance, angle θ may be 160° for the extended portion 36 and may be 150° for the extended portion 37.

The extended portions 36 and 37 may be sized and configured to block or deflect fluid flowing adjacent to the sides of the body 30 of the gear 29. The blocked or deflected fluid may be deflected to minimize windage loss that may result from fluid flowing in the channels 44 defined between adjacent gear teeth 31. For instance, an oil and air mixture may flow in a drive system to provide lubrication to rotating intermeshing gears. The oil and air mixture may flow adjacent to the gears 29, the bodies of the gears 30 and within the channels 44 defined by the teeth of the gears. The extended portions 36 and 37 may be positioned to block or direct flow of this fluid mixture of oil and air so that the flow of fluid within the channels 44 provides less drag on the rotation of the gears.

It should be understood that the extended portions 36 and 37 are positioned to extend outwardly to extend beyond the sides of the body 30 and positioned behind a front faces 51 of the teeth 31. The extended portions 36 and 37 extend outwardly and have distal ends that are positioned rearwardly and outwardly of the front faces 51 of the teeth 31. The front faces 51 of the teeth may be positioned frontward so that as the gear 29 rotates, the front faces 51 leads the rearward faces 52 of the tooth during the rotational movement along the direction defined by arrow 41. The extended portions may each define a furrow, groove or other aperture 71 adjacent the first side of the body of the gear as well.

Figure 5:
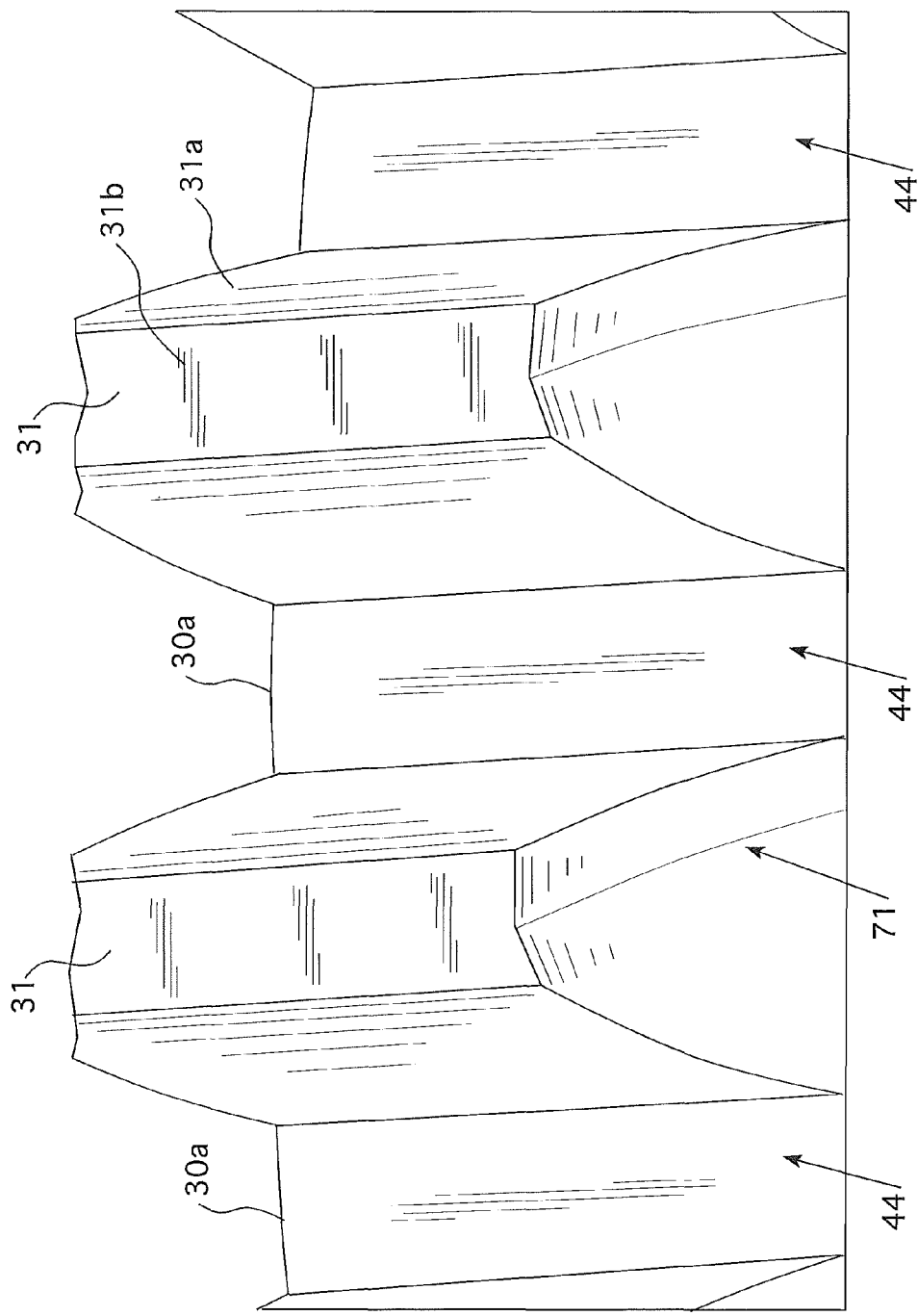
FIG. 5 is a fragmentary top perspective view illustrating a present preferred gear teeth arrangement.

Preferably, the extended portions 36 and 37 are shaped to define ramps or trailing ramps. The extended portions are sized and configured to turn away relative flow of fluid near the sides of the first and second sides of the body to include a local pressure rise on the extended portions to contribute to spin-down torque. As may be appreciated from FIG. 5 and Exhibits A and B of U.S. Provisional Patent Application No. 61/477,666, which are incorporated by reference herein, the diversion of the flow of fluid is sufficient to substantially reduce, if not virtually eliminate or completely eliminate, the flow of fluid into channels 44 between the teeth 31 of the gear. This provides much lower torques that contributes to windage loss, or drag, on the gear as it rotates in the direction of arrow 41. Since the fluid does not pass into the channel, it does not impinge upon the leading face, which will lead to an increase in pressure there. This increase in pressure acts to decelerate the gear and is therefore a loss of energy, so avoiding it reduces windage loss.

Of course, it is contemplated that the shape of the extended portion 36 and 37 may have a number of different configurations. For example, the distal end portions of the extended portions may extend more outwardly beyond the sides of the body of the gear than the sections of the extended portions 36 and 37 near the base portion 31a of the teeth 31 such that the extended portions are tapered. As another example, the distal end portions of the extended portions 36 and 37 may extend less outwardly than the portions of the extended portions adjacent to the base 31a of the teeth. As yet another example, the extent to which the extended portions extend beyond the sides of the body 30 may be uniform throughout the height of the teeth. As yet another example, the shape of the extended portions may be configured to be variable along the height of the extended portions 36 and 37 such that different sections of the extended portions are more outward than other sections. As yet another example, the extended portions may also extend radially beyond the tips of the middle portions of the gear teeth.

Since the extended portions 36 and 37 extend outwardly from the gear face, they do not have the same structural integrity and heat transfer requirements as the teeth themselves. For instance, the extended portions 36 and 37 do not impinge or contact teeth of other gears. Therefore their design requirements and manufacture of the extended portions 36 and 37 may be greatly simplified relative to the requirements for the teeth 31.

In some embodiments, each extended portion 36, 37 may utilize the same configuration or may have differing configurations. For example, the extended portions 37 of the first side may be of a different configuration, shape or size than the extended portions 36 of the second side.

It is contemplated that each tooth of a gear may only have one side that includes an extended portion. For example, some gears may be configured to have extended portions 36 on a first side of the teeth, but not include extended portions 37 on the opposite second side of the gear teeth. While a less preferred alternative, such a design has been found to provide as much as a 40% reduction of windage loss. This option is less preferred as the 40% reduction we found it to provide is not as much of a reduction in windage loss that we found to be achievable in certain embodiments of our gear that utilize extended portions 36, 37 on both sides of the gear teeth.

Figure 7:
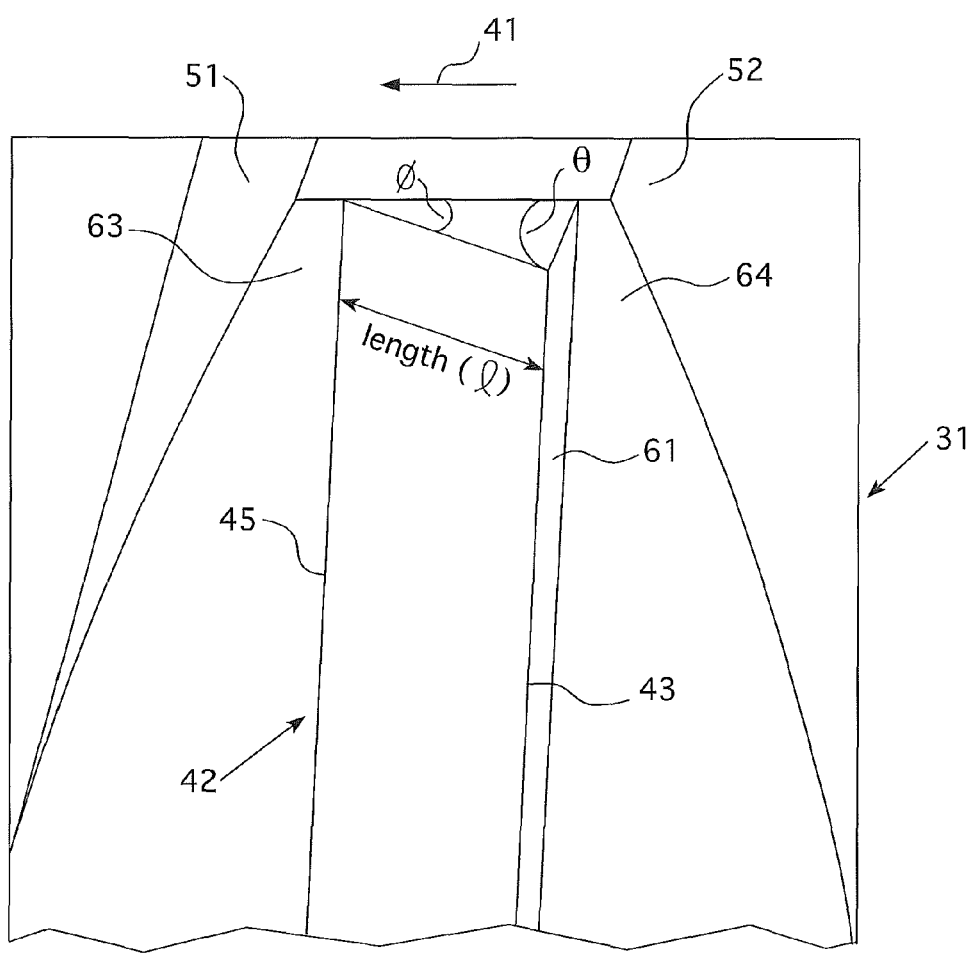
FIG. 7 is a fragmentary perspective view of an exemplary gear teeth configuration that may be utilized in embodiments of our gears.

Another contemplated embodiment may be appreciated from FIG. 7, which illustrates a gear tooth geometry that may be utilized in embodiments of our gear. The extended portions may extend from each side or just one side of each gear may be configured to position a ramp that functions as a spoiler at a center portion of each tooth 31. Each extended portion may be wedge shaped in profile to define a ramp 42, or spoiler. The length l of the defined ramp may extend along a portion of the thickness of the tip of the tooth from an inner edge 45 of the ramp to an outer edge 43 of the ramp A curved or substantially flat surface 49 may extend along this length l from the inner edge 45 to the outer edge 43 along an angle φ. The outermost edge 43 is opposite the innermost edge 45. The innermost edge 45 may be adjacent the front face 51 of the tooth that toward the direction of rotation 41 of the gear and toward a channel defined between the tooth and an immediately adjacent tooth. The outermost edge 43 may be opposite the innermost edge 45 and extend beyond the first side of a body of the gear and be positioned spaced apart from the rear face 52 of the tooth 31. A wall 61 may be defined by a surface extending from the outermost edge 44 of the ramp 42 to the side of the tooth to which the extended portion is attached. The surface defining the wall 61 may be a substantially flat or curved surface that extends inwardly from the outermost edge 44 to the side of the tooth from which the extended portion defining the ramp extends.

The center positioning of the ramp 42 may be configured so that the inner edge 44 and outer edge 43 of the extended portion defining the ramp 42 are not located in locations corresponding to the outermost locations of the tip of the tooth adjacent the rear face 52 and front face 51. For example, there may be a first space 63 between the front face 51 and the inner edge 44 of the ramp adjacent the tip of each of the teeth. As another example, there may be a second space 64 between the inner edge of wall 61 and the rear face 52 of the tooth.

Figure 6:
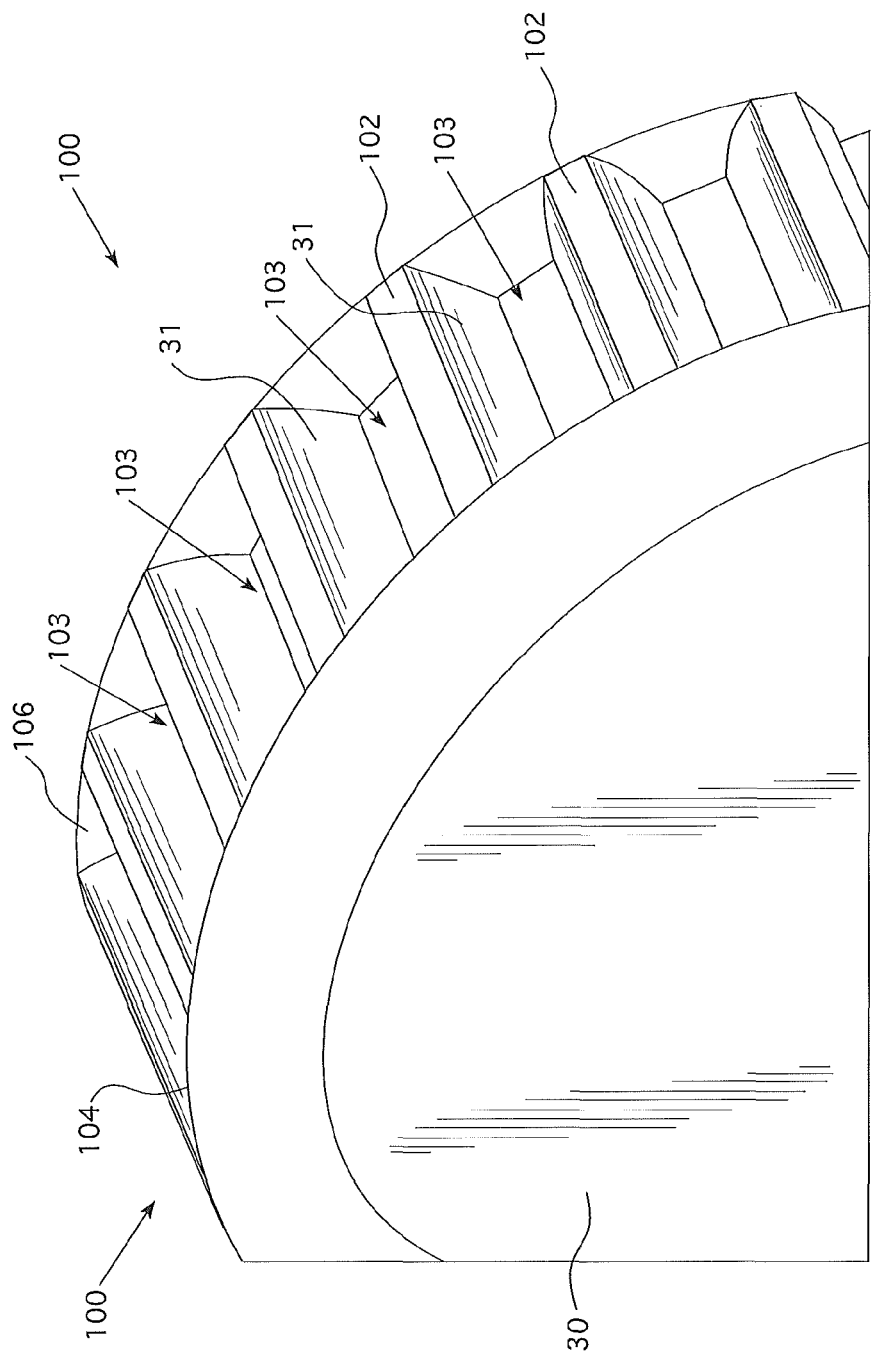
FIG. 6 is a perspective view of the right side of a present preferred embodiment of a gear to illustrate a first side of gear teeth of the gear. A thin annular structure is attached to the first side of the gear to affect full or partial flow blockage.

Referring to FIG. 6, another embodiment of a high speed gear 100 may include teeth 102 that project from a body of the gear. An annular ring 104 may be affixed to a first side of each tooth and an annular ring 106 may be attached to a second side of each tooth opposite the first side to enclose or partially enclose channels 103 defined between immediately adjacent teeth 102. The annular rings 104 and 106 may be other types of annular structures that accommodate the shape of the gear and may be attached to opposite sides of the teeth of the gear to block or at least partially block fluid from flowing within the channels 103 defined by the teeth of the gear. Preferably, the annular structures are composed of the same material as the gear and are either cast or molded with the gear, welded to the gear or are otherwise integrally attached to the gear after the gear is formed. Such annular structures may have radial slots to reduce weight, or otherwise be optimally shaped to maximize aerodynamic performance and minimize weight and vibration.

While certain present preferred embodiments of our drive system, embodiments of our gear, and embodiments of methods for making and using the same have been shown and described above, it is to be distinctly understood that the invention is not limited thereto but may be otherwise variously embodied and practiced within the scope of the following claims.

We claim:

1. A gear comprising:
    a body, the body having a first side, a second side opposite the first side and a surface extending between the first and second sides; and
    a plurality of teeth extending from the surface, each tooth of the plurality of teeth having a base portion adjacent to the surface of the body and a distal portion that defines a tip of the tooth, each tooth has a first side adjacent to the first side of the body and a second side adjacent to the second side of the body;
    a plurality of first extended portions,
        the first side of each tooth of the plurality of teeth being attached to a respective one of the first extended portions such that that extended portion extends beyond the first side of the body to divert a flow of fluid adjacent to the first side of the body to reduce windage losses that occur when the gear rotates; and
    wherein the first extended portions are each comprised of a structure defining a ramp that is integrally attached to the tooth to which that first extended portion is attached, the ramp defining a first outer surface that extends outwardly along a length from a middle portion of the first side of the tooth to which the first extended portion is attached to an outer edge and a second surface that extends inwardly from the outer edge to the first side of the tooth to which the first extended portion is attached, the first outer surface being opposite the second surface, the first outer surface being curved, flat or substantially flat, the second surface extending collinearly to a front or a rear of the tooth, the outer edge being adjacent the rear or the front of the tooth and positioned outwardly from the first side of the tooth.

2. The gear of claim 1 wherein the teeth are integral with the body and wherein the body and teeth are comprised of metal, steel, aluminum, cast aluminum, a ceramic material, a composite material, a polymeric material or plastic.

3. The gear of claim 1 further comprising a plurality of second extended portions and wherein the second side of each tooth of the plurality of teeth is attached to a respective one of the second extended portions such that that second extended portion extends beyond the second side of the body to divert a flow of fluid adjacent to the second side of the body to reduce windage losses that occur when the gear rotates.

4. The gear of claim 1 wherein the gear is sized and configured for use in systems requiring the gear to rotate at speeds with tip speeds greater than or equal to one of a Mach number of 0.2 and 68 m/s.

5. The gear of claim 1 wherein the fluid is comprised of a mixture of oil and air and the body of the gear defines an aperture sized and configured to receive at least a portion of an axle.

6. The gear of claim 1 wherein each of the teeth extends from the base portion to the tip portion in a direction that is perpendicular or substantially perpendicular to an axis of rotation along which the gear rotates.

7. The gear of claim 6 wherein the gear is a spur gear, a helical gear, a bevel gear, a planetary sun gear, a planetary star gear, a planetary ring gear, an internal gear, or a sprocket.

8. The gear of claim 1 wherein each of the first extended portions is attached to a respective one of the teeth to which that first extended portion is attached so that that first extended portion extends such that the first extended portion projects at between a 90 degree angle and a 180 degree angle relative to at least one of a middle portion of the tooth to which that first extended portion is attached positioned between the first and second sides of that tooth and the first side of the body.

9. The gear of claim 1 wherein each of the first extended portions extends beyond the first side of the body such that the first extended portion defines a groove or furrow; and
    wherein the base portions of the teeth are spaced apart from each other along the surface of the body such that channels are defined between immediately adjacent teeth; and
    wherein the first extended portions reduce windage losses that occur when the gear rotates by partially diverting fluid from passing into the channels.

10. The gear of claim 1 wherein the ramp is defined by the first outer surface such that the ramp has an inner edge, the first extended portion attached to the first side of the tooth at the inner edge.

11. The gear of claim 10 wherein each of the first extended portions is also comprised of a wall, the wall defined by the second outer surface extending from the outer edge of the ramp to a portion of the first side of the tooth adjacent the inner edge of the ramp.

12. A gear comprising:
    a body, the body having a first side, a second side opposite the first side and a surface extending between the first and second sides; and
    a plurality of teeth extending from the surface, each tooth of the plurality of teeth having a base portion adjacent to the surface of the body and a distal portion that defines a tip of the tooth, each tooth has a first side adjacent to the first side of the body and a second side adjacent to the second side of the body;
    a plurality of first extended portions,
    the first side of each tooth of the plurality of teeth being attached to a respective one of the first extended portions such that that extended portion extends beyond the first side of the body to divert a flow of fluid adjacent to the first side of the body to reduce windage losses that occur when the gear rotates; and
    wherein each of the first extended portion is also comprised of a wall, the wall defined by a second outer surface extending from the outer edge of the ramp to a portion of the first side of the tooth; and
    wherein for each first extended portion, a first space is defined between the inner edge of the ramp and a first face of the tooth to which the first extended portion is attached and a second space is defined between an inner edge of the wall of the ramp engaging the first side of the tooth to which the first extended portion is attached and a second face of the tooth to which the first extended portion is attached, the second face of the tooth being opposite the first face of the tooth.

13. A drive system, the drive system being a drive system of a rotorcraft or a drive system of an airplane, the drive system comprising:
a first gear and a second gear; and
an axle connected to the first gear to rotate the first gear along an axis of rotation;
the first gear having:
a first body, the first body having a first side, a second side opposite the first side, a first surface extending between the first and second sides and plurality of first teeth extending from the first surface, each first tooth of the plurality of first teeth having a base portion adjacent to the first surface of the first body and a distal portion that defines a tip of the first tooth, each first tooth has a first side adjacent to the first side of the first body and a second side adjacent to the second side of the first body,
for each first tooth of the first teeth:
a first extended portion being attached to the first side of the first tooth such that the first extended portion extends beyond the first side of the first body to divert a flow of fluid adjacent to the first side of the first body to reduce windage losses that occur when the first gear rotates,
wherein the first extended portion is comprised of a structure defining a first ramp that is integrally attached to the first tooth to which that first extended portion is attached, the first ramp defining a first outer surface that extends outwardly along a length from a middle portion of the first side of the first tooth to which the first extended portion is attached to a first outer edge and a second surface that extends inwardly from the first outer edge to the first side of the first tooth to which the first extended portion is attached, the first outer surface of the first extended portion being opposite the second surface of the first extended portion, the first outer surface of the first extended portion being curved, flat or substantially flat, the second surface of the first extended portion extending collinearly to a front or a rear of the first tooth, the first outer edge being adjacent the rear or the front of the first tooth and positioned outwardly from the first side of the first tooth;
the second gear having:
a second body, the second body having a first side, a second side opposite the first side of the second body, a second surface extending between the first and second sides of the second body, and plurality of second teeth extending from the second surface, each second tooth of the plurality of second teeth having a base portion adjacent to the second surface of the second body and a distal portion that defines a tip of the second tooth, each second tooth has a first side adjacent to the first side of the second body and a second side adjacent to the second side of the second body,
for each second tooth of the second teeth:
a second extended portion being attached to the first side of the second tooth such that the second extended portion extends beyond the first side of the second body to divert a flow of fluid adjacent to the first side of the second body and reduce windage losses that occur when the second gear rotates,
wherein the second extended portion is comprised of a structure defining a second ramp that is integrally attached to the second tooth to which that second extended portion is attached, the second ramp defining a first outer surface that extends outwardly along a length from a middle portion of the first side of the second tooth to which the second extended portion is attached to a second outer edge and a second surface that extends inwardly from the second outer edge to the first side of the second tooth to which the second extended portion is attached, the first outer surface of the second extended portion being opposite the second surface of the second extended portion, the first outer surface of the second extended portion being curved, flat or substantially flat, the second surface of the second extended portion extending collinearly to a front or a rear of the second tooth, the second outer edge being adjacent the rear or the front of the second tooth and positioned outwardly from the first side of the second tooth;
the first and second gears positioned such that the first teeth of the first gear intermesh with the second teeth of the second gear to rotate the second gear;
and wherein the first gear and second gear are at least partially surrounded by fluid.

14. The drive system of claim 13 wherein the first gear is positioned to cover a portion of the axle.

15. The drive system of claim 13 wherein the fluid is an oil-air mixture.

16. The drive system of claim 13 wherein the first gear and second gear are configured to provide a reduction ratio of between 10:1 and 200:1.

* * * * *